(12) United States Patent
Servin et al.

(10) Patent No.: US 11,840,919 B2
(45) Date of Patent: Dec. 12, 2023

(54) PHOTOACOUSTIC NANOTRACERS

(71) Applicant: Saudi Arabian Oil Company, Dhahran (SA)

(72) Inventors: Jesus Manuel Felix Servin, Dhahran (SA); Nan Shi, Dammam (SA); Amr I. Abdel-Fattah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 19 days.

(21) Appl. No.: 17/140,458

(22) Filed: Jan. 4, 2021

(65) Prior Publication Data
US 2022/0213785 A1   Jul. 7, 2022

(51) Int. Cl.
*E21B 47/11* (2012.01)
*G01V 11/00* (2006.01)

(52) U.S. Cl.
CPC ............ *E21B 47/11* (2020.05); *G01V 11/00* (2013.01)

(58) Field of Classification Search
None
See application file for complete search history.

(56) References Cited

U.S. PATENT DOCUMENTS

| | | |
|---|---|---|
| 4,433,291 A | 2/1984 | Yariv et al. |
| 4,589,285 A | 5/1986 | Savit |
| 4,650,281 A | 3/1987 | Jaeger et al. |
| 5,096,277 A | 3/1992 | Kleinerman |
| 6,250,848 B1 * | 6/2001 | Moridis ............... E21B 33/138 405/266 |
| 6,380,534 B1 | 4/2002 | Mahmoud et al. |
| 6,555,807 B2 | 4/2003 | Clayton et al. |
| 6,662,627 B2 | 12/2003 | Arnott et al. |
| 8,575,541 B1 * | 11/2013 | Jamison ............... E21B 21/00 250/253 |
| 8,596,354 B2 | 12/2013 | Hartshorne et al. |
| 8,661,907 B2 | 3/2014 | Davis et al. |
| 8,816,689 B2 | 8/2014 | Colombo et al. |
| 9,290,689 B2 | 3/2016 | Lafitte et al. |
| 9,651,476 B2 | 5/2017 | Speck et al. |

(Continued)

FOREIGN PATENT DOCUMENTS

| | | |
|---|---|---|
| GB | 2442745 | 4/2011 |
| WO | WO 2004113677 | 12/2004 |

(Continued)

OTHER PUBLICATIONS

Agenet et al., "Fluorescent nano beads: a first step toward intelligent water tracers," SPE 157019, Society of Petroleum Engineers, presented at the SPE international oilfield nanotechnology conference held in Noordwijk, the Netherlands, Jun. 12-14, 2012, 13 pages.

(Continued)

*Primary Examiner* — Charles R Nold
(74) *Attorney, Agent, or Firm* — Fish & Richardson P.C.

(57) ABSTRACT

Subsurface environments can be characterized using photoacoustic nanotracers. A solution including a photoacoustic nanotracer is formed. The solution is injected into the subsurface environment. Produced fluids are analyzed for the photoacoustic nanotracer. A breakthrough curve is built based, at least in part, on the analysis. The photoacoustic nanotracers can be based on plasmonic gold nanoparticles, silver nanoparticles, or both.

14 Claims, 5 Drawing Sheets

(56) References Cited

U.S. PATENT DOCUMENTS

| | | | |
|---|---|---|---|
| 9,791,417 | B2 | 10/2017 | Irisawa et al. |
| 9,910,026 | B2 | 3/2018 | Zhang et al. |
| 10,429,350 | B2* | 10/2019 | Csutak .................. G01N 29/228 |
| 10,444,065 | B2 | 10/2019 | Schmidt et al. |
| 10,895,497 | B2 | 1/2021 | Schmidt et al. |
| 2009/0264768 | A1 | 10/2009 | Courtney |
| 2010/0200744 | A1 | 8/2010 | Pearce et al. |
| 2012/0092960 | A1 | 4/2012 | Gaston et al. |
| 2014/0036628 | A1 | 2/2014 | Hill et al. |
| 2014/0159715 | A1 | 6/2014 | McEwen-King |
| 2014/0200511 | A1 | 7/2014 | Boyden |
| 2015/0025373 | A1* | 1/2015 | Kim ..................... A61B 8/4416 600/431 |
| 2015/0192436 | A1 | 7/2015 | Farhadiroushan et al. |
| 2015/0337874 | A1 | 11/2015 | Park |
| 2016/0002523 | A1 | 1/2016 | Huh et al. |
| 2016/0146662 | A1 | 5/2016 | Stokely et al. |
| 2018/0171782 | A1 | 6/2018 | Cox et al. |
| 2019/0360326 | A1* | 11/2019 | Deville .................. E21B 47/11 |

FOREIGN PATENT DOCUMENTS

| | | |
|---|---|---|
| WO | WO 2014100275 | 6/2014 |
| WO | WO 2015020642 | 2/2015 |
| WO | WO 2017205565 | 11/2017 |

OTHER PUBLICATIONS

Alwi et al., "Silica-coated super paramagnetic iron oxide nanoparticles (SPION) as biocompatible contrast agent in biomedical photoacoustics," Biomed. Opt. Express, Oct. 2012, 3(10):2500- 2509, 10 pages.

americanpiezo.com' [online], "Stripe Actuators," available on or before Mar. 13, 2011, via Internet Archive: Wayback Machine URL <https://web.archive.org/web/20110313073802/https://www.americanpiezo.com/standard-products/stripe-actuators.html>, [retrieved on Apr. 6, 2018], retrieved from: URL <https://www.americanpiezo.com/standard-products/stripe-actuators.html>, 2 pages.

Ansari et al., "Design of the fiber optic distributed acoustic sensor based on Michelson interferometer and its location application," Optical Engineering, Oct. 1, 2003, 42, 1 page, Abstract only.

bayspec.com' [online], "SuperGamut NIR Spectrometer," available on or before Feb. 2014, [retrieved Apr. 18, 20180], retrieved from: URL <http://www.bayspec.com/wp-content/uploads/2014/02/BaySpec-Datasheet-nir-swir.pdf>, 6 pages.

Boman, "DAS technology expands fiber optic applications for oil, gas industry," Rigzone, May 4, 2015, 4 pages.

Colombo and McNeice, "Quantifying surface-to-reservoir electromagnetics for waterflood monitoring in a Saudi Arabian carbonate reservoir," Geophysics vol. 78, Issue 6, Nov. 2013, 17 pages.

Jacobs et al., "Downhole fiber-optic monitoring: an evolving technology," Society of Petroleum Engineers, Journal of Petroleum Technology vol. 66, Issue 08, Aug. 2014, 2 pages, Abstract only.

Lemaster et al., "What is new in nanoparticle-based photoacoustic imaging?," WIREs Nanomed Nanobiotechnol, 2016, 11 pages.

Li et al., "Nanoparticle tracers in calcium carbonate porous media," Journal of Nanoparticle Research, Jul. 2014, 16:2541, 14 pages.

optasense.com' [online], "Oilfield Services," available on or before Jun. 2, 2015, via Wayback Machine URL <https://web.archive.org/web/20150602040413/http://www.optasense.com/our-solutions/oilfield-services/>, [retrieved Apr. 6, 2018], retrieved from URL <http://www.optasense.com/our-solutions/oilfield-services/>, 1 page.

piceramic.com' [online], "Rectangular Bending Elements," available on or before Mar. 31, 2017, via Internet Archive: Wayback Machine URL <https://web.archive.org/web/20170331054949/https://www.piceramic.com/en/products/piezoceramic-components/bending-elements/>, [retrieved Apr. 6, 2018], retrieved from: URL <https://www.piceramic.com/en/products/piezoceramic-components/bending-elements/>, 2 pages.

rio-lasers.com' [online], "Redfern Integrated Optics (RIO) Colorado Tunable Laser Source," available on or before Sep. 1, 2016, via Wayback Machine URL <https://web.archive.org/web/20160901172454/http://www.rio-lasers.com/pdf/Rio_Colorado_Product%20Brief_1.24.14.pdf> [retrieved Apr. 6, 2018], retrieved from URL <http://www.rio-lasers.com/pdf/Rio_Colorado_Product Brief_1.24.14.pdf>, 2 pages.

sbl.com' [online], "Distributed Acoustic Sensing Technology," available on or before Feb. 11, 2017, via Wayback Machine URL <https://web.archive.org/web/20170211002616/https://www.slb.com/services/characterization/geophysics/wireline/distributed-acoustic-seismic-sensing.aspx>, [retrieved on Apr. 6, 2018], retrieved from URL <https://www.slb.com/services/characterization/geophysics/wireline/distributed-acoustic-seismic-sensing.aspx>, 1 page.

Sedlar et al., "Optical fiber magnetic field sensors with ceramic magnetostrictive jackets," Applied Optics, vol. 35, Issue 27, Sep. 20, 1996, 2 pages, abstract only.

Sharafi et al., "Synthesis of Silica-coated Iron Oxide Nanoparticles: Preventing Aggregation without Using Additives or Seed Pretreatment," Iranian Journal of Pharmaceutical Research, 2018, 17(1): 386-395, 10 pages.

Song et al., "Near-Infrared Gold Nanocages as a New Class of Tracers for Photoacoustic Sentinel Lymph Node Mapping on a Rat Model," Nano Letters, 2009, 9(1): 183-188, 6 pages.

steminc.com' [online], "Piezo Ceramic Plate 26×8×0.7mm 108 KHz," available on or before Dec. 30, 2013, via Internet Archive Wayback Machine URL <https://web.archive.org/web/20131230010212/https://www.steminc.com/PZT/en/piezo-ceraminc-plate-26x8x7mm-108-khz>, [retrieved on Apr. 6, 2018], retrieved from URL <https://www.steminc.com/PZT/en/piezo-ceraminc-plate-26x8x7mm-108-khz>, 1 page.

Udd, "An overview of fiber-optic sensors," Review of Science Instruments 66, 4015, Jun. 1995, 16 pages, Abstract only.

wikipedia.com' [online], "Distributed acoustic sensing", Jan. 17, 2012, [retrieved on Feb. 23, 2018], retrieved from URL <https://en.wikipedia.org/wiki/Distributed_acoustic_sensing>, 5 pages.

Yamamoto, "Imaging the permeability structure within the near-surface sediments by acoustic crosswell tomography," Journal of Applied Geophysics, vol. 47, Issues 1, May 2001, 11 pages.

Yang et al., "Nanoparticles for photoacoustic imaging," WIREs Nanomed Nanobiotechnol, Jun. 2009, 1(4): 360-368, 9 pages.

PCT International Search Report and Written Opinion in International Appln. No. PCT/US2022/011157, dated Apr. 11, 2022, 14 pages.

* cited by examiner

PHOTOACOUSTIC NANOTRACERS

TECHNICAL FIELD

The present disclosure is directed to tracers for subsurface characterization.

BACKGROUND

Tracers are a practical tool to gather information about the subsurface fluid flow in hydrocarbon reservoirs. Typical inter-well tracer tests involve injecting and producing tracers from multiple wells to evaluate important parameters such as connectivity among wells, flow paths, fluid-fluid and fluid-rock interactions, and reservoir heterogeneity, among other properties of a hydrocarbon reservoir. For this purpose, passive (or conservative) tracers are the preferable choice. The most common passive tracers include radioactive, inorganic elements, alcohols, fluorescent molecules, and fluorinated benzoic acids, all bearing advantages and disadvantages. Within the oil industry, fluorinated benzoic acid tracers are the most popular. Fluorescent tracers, while available in the form of fluorescent molecules, have not been as popular in the oil and gas industry mainly due to their instability at reservoir conditions and significant retention while transporting through the reservoir.

SUMMARY

An embodiment described in examples herein provides a method for using a photoacoustic nanotracer to characterize a subsurface environment. The method includes forming a solution including a photoacoustic nanotracer, injecting the solution into the subsurface environment, and analyzing produced fluids for the photoacoustic nanotracer. A breakthrough curve is built based, at least in part, on the analysis.

Another embodiment described in some examples herein provides a system for characterizing a subsurface environment. The system includes, a pulsed laser, an acoustic detector, and a photoacoustic nanotracer including nanoparticles, wherein the pulsed laser irradiates produced fluids and, when a nanoparticle is in a beam from the pulsed laser, the acoustic detector detects an acoustic signal.

DETAILED DESCRIPTION

As described herein, novel photoacoustic nanotracers based on nanoparticles can be used to overcome disadvantages with current tracers. The photoacoustic effect is the formation of sound waves following light absorption in a material sample. This phenomenon can be exploited to create nanoparticles to be used as photoacoustic nanotracers that can be detected by a combination of an electromagnetic source, such as laser light, and one or more acoustic transducers. Among the advantages of nanoparticles as photoacoustic nanotracers is the capability to functionalize the surface to improve the stability in high salinity and temperature environments as well as to decrease the interaction with rock surface.

The photoacoustic nanotracers can be used for subsurface characterization. The invention is optimized for the use in hydrocarbon reservoirs. The tracers consist of nanoparticles that emit sound when excited by electromagnetic radiation of a certain frequency range, such as near infrared light. This phenomenon is known as the photoacoustic or optoacoustic effect. Exploiting this effect it is possible to engineer nanoparticles to function as photoacoustic nanotracers for inter-well studies of hydrocarbon reservoirs. The main advantage over conventional fluorobenzoic acid (FBA)-based tracers is a much simpler detection method that requires only a light source, e.g., a laser, with a narrow emission spectrum as the excitation source and acoustic transducers to perform the detection of the tracers. The photoacoustic nanotracers have a number of advantages over fluorescent tracers. For example, the photoacoustic nanotracers are not affected by photobleaching. Further, as the detection of the photoacoustic nanotracers is based on sound rather than light, the background fluorescence of aromatic compounds and other contaminants found in produced water does not interfere with the tracer detection.

Figure 1:
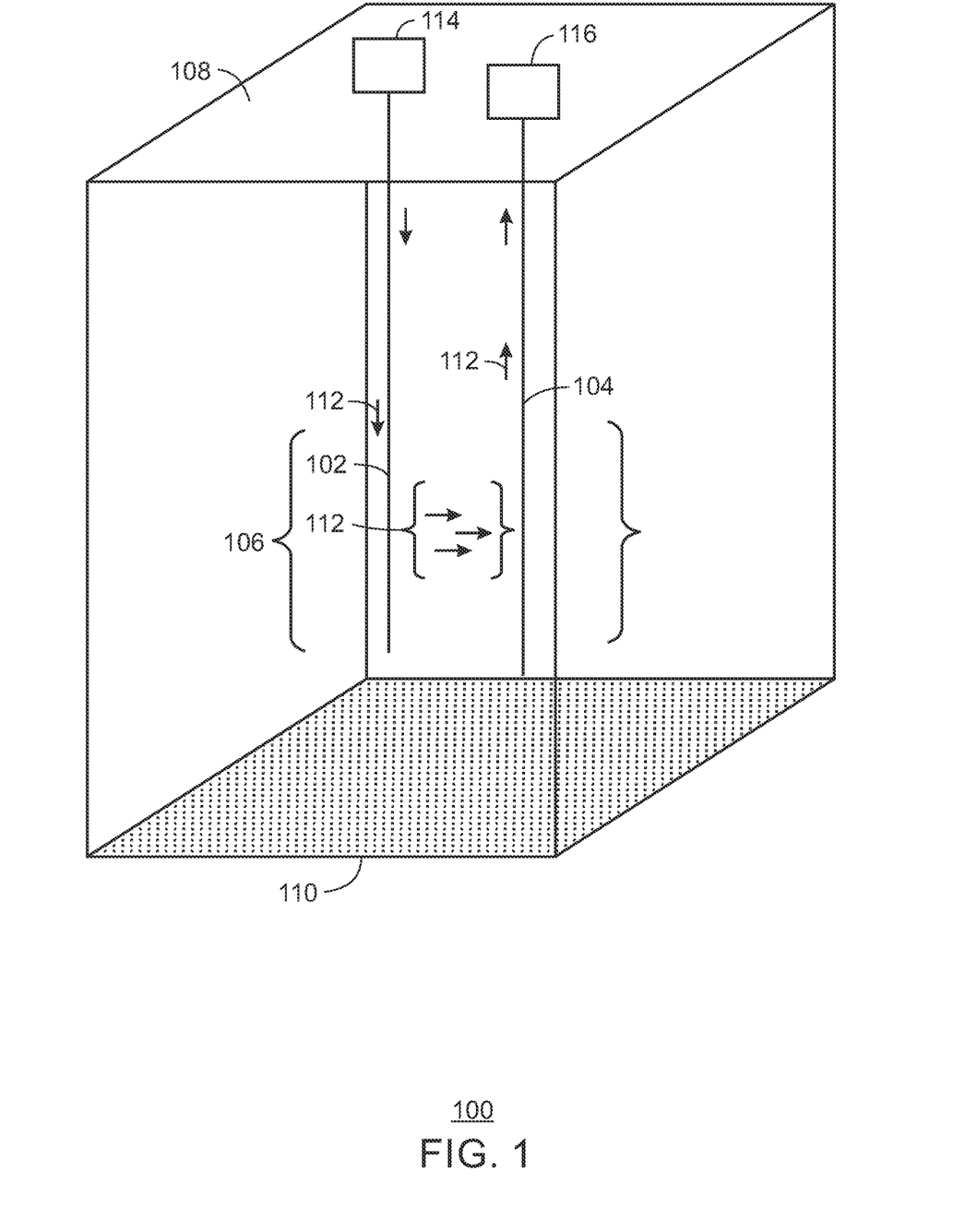
FIG. 1 is a schematic diagram of a method for using photoacoustic nanotracers to track flow between two wellbores in a subsurface environment, for example, in a reservoir layer.

FIG. 1 is a schematic diagram of a method 100 for using photoacoustic nanotracers to track flow between two wellbores 102 and 104 in a subsurface environment, for example, in a reservoir layer 106. As shown in FIG. 1, the reservoir layer 106 is located in the subsurface environment between the surface 108 and a lower layer, such as a water table 110.

The photoacoustic nanotracers 112 are mixed into a solution at the surface 108 and pumped from surface facilities 114 through an injection well 102 into the reservoir layer 106. In this embodiment, the surface facilities 114 includes the mixing tanks for mixing the photoacoustic nanotracers 112 into an aqueous solvent and the pump for injecting the photoacoustic nanotracers 112 into the injection well 102.

In the reservoir layer 106, the photoacoustic nanotracers 112 flow through the pores of the rock of the reservoir layer 106 before reaching a production well 104. The photoacoustic nanotracers 112 are then carried back to the surface 108.

Figure 3:
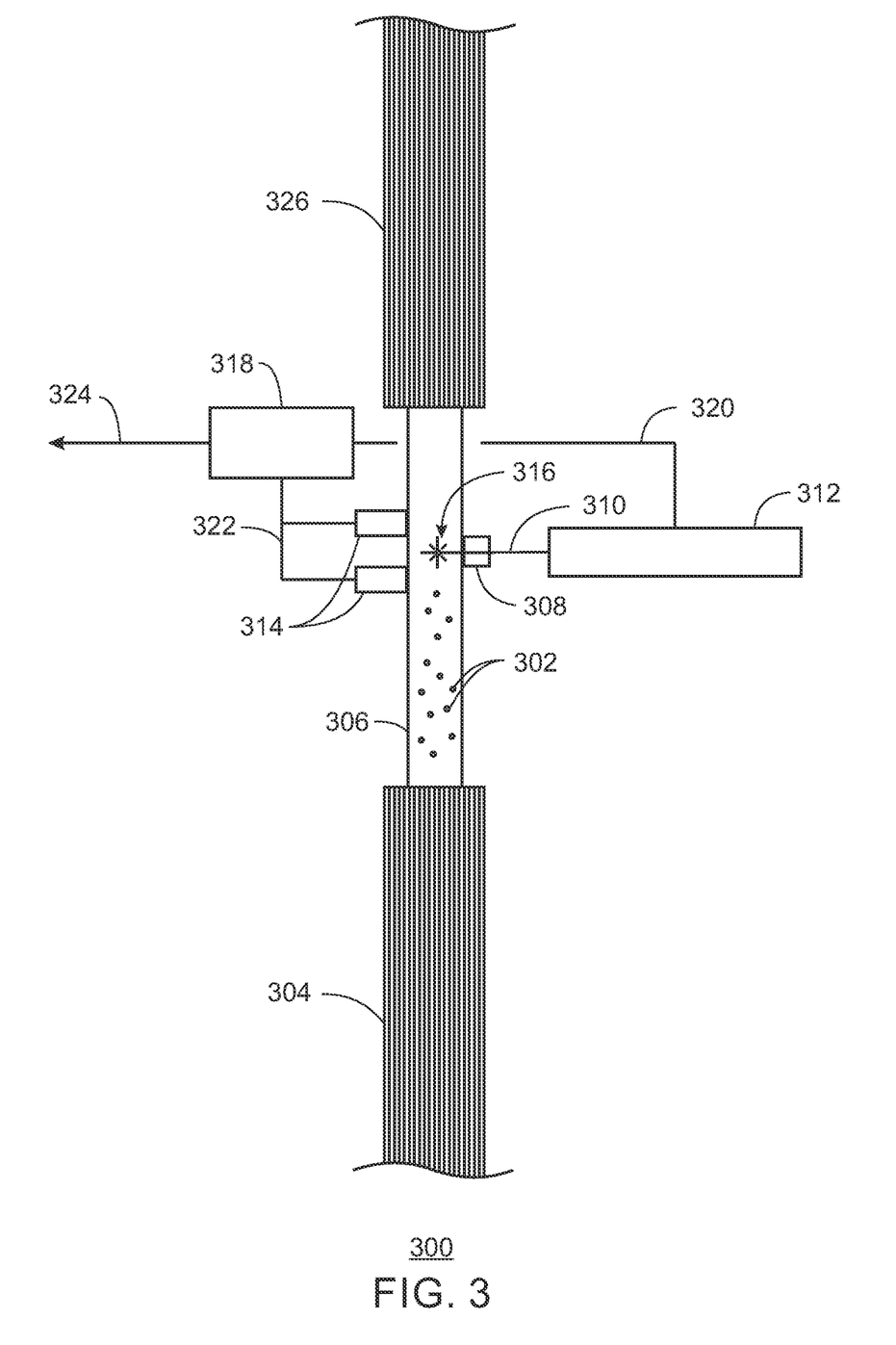
FIG. 3 is a drawing of a photoacoustic detection system for identifying and quantitating photoacoustic nanotracers in produced fluids flowing from a wellbore.

A production facility 116 at the surface 108 may include a detection system, for example, as described with respect to FIG. 3, to directly detect the photoacoustic nanotracers 112. In some embodiments, the production well 104 will not have a high enough concentration of the photoacoustic nanotracers 112 for reliable detection by an online system. In these embodiments, samples of the production fluid may be taken to a laboratory for concentration of the fluids containing the photoacoustic nanotracers 112 or for direct separation of the photoacoustic nanotracers 112 from the production fluid.

Photoacoustic nanotracers 112 are promising for oil reservoir characterization for a number of reasons. The use of electromagnetic excitation is relatively simple. Further, the photoacoustic nanotracers 112 do not have interference from background fluorescence caused by aromatic compounds and contaminants in produced fluids. Further, as described with respect to FIGS. 2A-2C, adjusting the size, shape, and materials of the nanoparticles can be used to provide multiple unique tracers that can be injected into the subsurface environment in a single mixture or through different wells and differentiated by the excitation wavelengths and emission frequencies, allowing multiplexing of the analysis. For example, different photoacoustic nanotracers may be used in different injection wells and identified from a single production well. The photoacoustic nanotracers 112 are also more stable than fluorescent tracers, decreasing the problem of photobleaching.

Figure 2A:
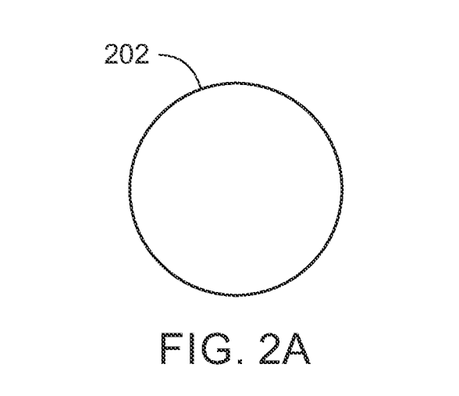
FIGS. 2A-2C are representative photoacoustic nanotracers that may be used for characterizing a subsurface environment.
Figure 2B:
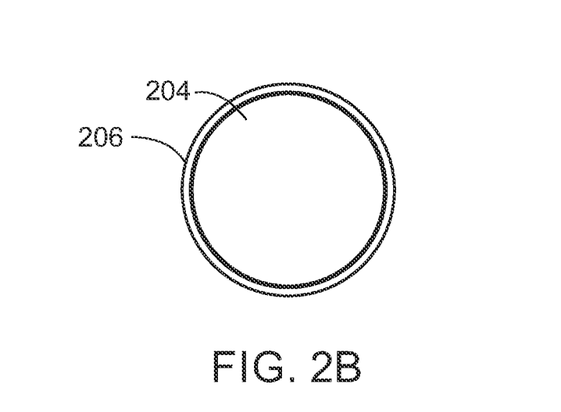
Figure 2C:
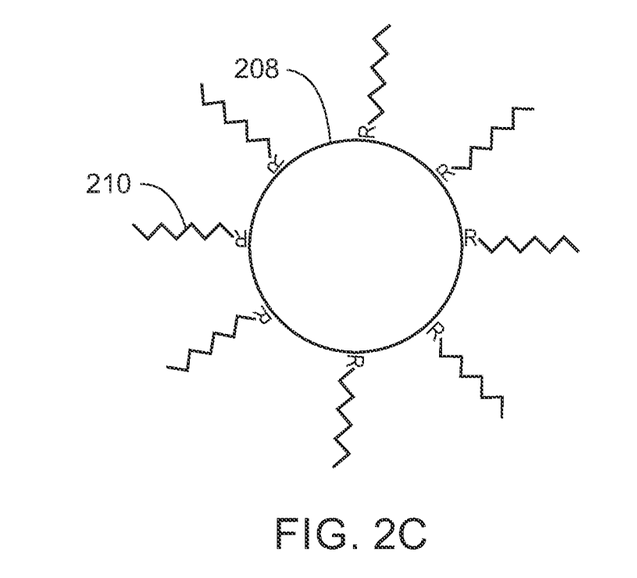

FIGS. 2A-2C are representative photoacoustic nanotracers that may be used for characterizing a subsurface environment. FIG. 2A is a nanoparticle 202 that is used as a photoacoustic nanotracer in some embodiments. The nanoparticle 202 emits sound when excited by light or, in general, an electromagnetic source of a specific wavelength, for example, with a range of about 25 nm to 75 nm on each side of the peak absorbance. When the nanoparticle 202 is irradiated at the target wavelength, light is absorbed, which leads to a rise in temperature. The temperature increase generates a thermal expansion that increases the local pressure, leading to the formation of sound waves. To observe the photoacoustic effect, the light intensity has to vary over time, either in the form of modulated light or as a light pulse. The mechanism is explained by the formula shown in Equation 1.

$$p_0 = \beta \Delta T / k \tag{1}$$

In equation 1, $p_0$ is the pressure increase, $\beta$ is the thermal expansion coefficient, $\Delta T$ is the change in temperature and k is the isothermal compressibility of the nanoparticle.

Equation 1 suggests two approaches to magnify the pressure increase and, accordingly, the magnitude of emitted sound. For the instrument design, $\Delta T$ can be maximized by choosing the right excitation frequency and by increasing the intensity of the excitation source. For the nanoparticle 202 to function as photoacoustic nanotracers, materials with large $\beta$ and small k values can be selected.

Furthermore, the nanoparticle 202 can be engineered to have a high cross-section area for efficient absorption. Nanoparticles are used as contrast agents in photoacoustic imaging for biological applications due to their high and stable signal and because their surface can be functionalized. Metallic nanoparticles are often used as photoacoustic contrast agents because of their high absorption cross section, which is a measure of the ability of the nanoparticle to absorb a photon of a specific wavelength and polarization. Further, gold and silver nanoparticles are commercially available as colloidal gold and colloidal silver. In addition, the synthesis of metallic particles of particular sizes is known in the art.

In various embodiments, the size and shape of the nanoparticle 202 can be modified to tune the absorption peak for multiplexing. In general, the absorption maximum of gold nanoparticles shifts toward the red spectrum as size increases. In addition, changing the shape of the nanoparticle changes their absorption properties. For example, spherical and irregular-shaped gold nanoparticles of the same average size exhibit absorption maximum at different wavelengths due to an anisotropic distribution of the surface electron layers in the latter.

In some embodiments, the nanoparticle 202 is plasmonic gold and silver nanoparticles with sizes ranging from 20 to 150 nm or from 400 to 900 nm. As used herein, plasmonic indicates that the gold and silver nanoparticles may function in clusters that interact with surrounding molecules to change the absorbance characteristics. The size of the nanoparticle 202 affects the peak absorption of the nanoparticle. In some embodiments, multiple unique photoacoustic nanotracers are made from the same material by changing the size. Accordingly, in these embodiments, different light sources are used, each with a wavelength that corresponds to the peak absorption wavelength of a specific photoacoustic nanotracer. Accordingly, measurements can be multiplexed using this technique.

The main criteria for the size of the nanoparticle 202 is the pore-throat size in the subsurface environment. Generally, the nanoparticle 202 is selected to be at least 5-15 times smaller than the smallest pore-throat it has to go through. The size may also control the frequency used to excite the nanoparticle 202. Accordingly, the frequency of the laser is adjusted for the size of the nanoparticle 202 so that the center frequency of the laser corresponds to the absorption maximum of the nanoparticle.

In some embodiments, the nanoparticle 202 is an upconverting nanoparticle (UCNPs). UCNPs may be good photoacoustic nanotracers as they have narrow excitation/emission profiles. UCNPs are typically based on phosphors (e.g. $NaYF_4$) doped with ytterbium ($Yb^{3+}$), erbium ($Er^{3+}$) and terbium ($Tb^{3+}$). Copper and copper sulfide have also been used. In some embodiments, copper sulfide is used, allowing the absorption peak to be tuned. In some embodiments, nanoparticle 202 is formed from single-walled carbon nanotubes (SWCNs).

In some embodiments, as shown in FIG. 2B, a coated nanoparticle 204 is used. For example, the coating 206 may be a silica layer, silica-coated iron oxide nanoparticles, or silica-coated gold nanoparticles. The advantage of silica-coated nanoparticles is that their surface chemistry can be modified to allow for additional functionalization. The material choice will depend on the number of unique tracers required, the reservoir rock type and other reservoir parameters such as salinity, temperature and pH.

In some embodiments, the coating is performed by the Stöber process, for example, used to prepare silica-coated iron oxide nanoparticles. In the Stöber process, a reaction mixture consisting of water, ethanol and a catalyst is seeded with iron oxide particles. A silica precursor monomer is added. The hydrolysis and condensation of the precursor monomer results in the deposition of a silica layer on the iron oxide particles.

In some embodiments, as shown with respect to FIG. 2C, a surface functionalized nanoparticle 208 is used. The surface functionalized nanoparticle 208 is functionalized with an absorbed species 210 surfactants or polymers that are adsorbed. For example, surfactants or polymers that are terminated with thiol groups, thiocarboxylic acid, or other moieties comprising sulfur, may be used to functionalize gold nanoparticles. For example, the surface coating may include anionic surfactants, such as SDS, cationic surfactants, such as CTAB, or dextran, among others. Other moieties may be selected depending on the metal chosen.

FIG. 3 is a drawing of a photoacoustic detection system 300 for identifying and quantitating photoacoustic nanotracers 302 in produced fluids flowing from a wellbore 304. It can be noted that the photoacoustic detection system 300 shown in FIG. 3 is generally used when the concentration of the photoacoustic nanotracers 302 is high enough to be detected by an online system in a direct flow. In other embodiments, the produced fluids are sampled and concentrated for off-line analysis. In some embodiments, the photoacoustic nanotracers can be detected at a concentration of parts-per-billion (ppb), for example, depending on the excitation frequency, the pulse energy, heat capacity of the fluid, or the thermal expansion coefficient, among other factors.

In this embodiment, the produced fluids including the photoacoustic nanotracers 302 flow from the wellbore 304 through a sampling tubular 306. The sampling tubular 306 may be a section of piping that includes an optical port 308 to allow a beam 310 of electromagnetic (EM) radiation, such as a laser beam, to be introduced into the production fluids from an excitation source 312.

The most common excitation range for photoacoustic techniques ranges between 680 and 1100 nm, which falls within the near infrared (NIR) region. Further, NIR is the preferred option for biological applications because it has greater penetration in biological systems than wavelengths corresponding to the visible region. Accordingly, in some embodiments, the excitation source 312 is a neodymium/yttrium-aluminum-garnet (Nd/YAG) laser. Higher power lasers may be used to increase signal amplitude. The wavelength of the laser is selected to match the peak absorbance of the nanoparticle. For example, and Nd/YAG laser may be frequency doubled to obtain a 532 nm beam. Further, other wavelengths may be obtained by frequency doubling, a frequency comb, secondary laser excitation, laser detuning, or other techniques.

Further, for photoacoustic nanotracer detection and quantification in hydrocarbon systems, other types of EM radiation may be used, since the depth of penetration may be higher in a hydrocarbon solvent. In some embodiments, the excitation source 312 may use EM radiation that includes radio frequencies, microwave frequencies, and x-ray frequencies to excite the photoacoustic nanotracers 302. In some embodiments, EM radiation in a second NIR window (termed NIR II), which ranges between 1000 and 1500 nm, is used as less absorption and scattering may occur. In some embodiments, the beam 310 includes pulses of EM radiation, for example, in the nanosecond range. In some embodiments, the beam 310 is a millisecond-long coded continuous wave (CW) source. In some embodiments, the power of the excitation source 312 is around 1 W, 5 W, 10 W, or higher, although higher or lower powers may be used, depending on whether the photoacoustic nanotracers 302 have a substantial response to the EM radiation. In some embodiments, the excitation sources are at much higher powers, such as 500 W, 1 kW, 5 kW, or higher, allowing the detection of much smaller amounts of particles.

One or more acoustic detectors 314 may be installed in contact with the sampling tubular 306, or pass through ports on the sampling tubular 306 to allow direct contact with the produced fluids. When the photoacoustic nanotracers 302 are excited by the beam 310, they will produce acoustic waves 316 having a pattern that is similar to the pattern of the EM radiation used for excitation, e.g., pulse separation, etc. The acoustic waves 316 are detected by the acoustic detectors 314. In some embodiments, the acoustic detectors 314 are ultrasonic transducers, for example, in an array of multiple acoustic detectors 314. Ultrasonic transducers that may be used in embodiments are commercially available. In an embodiment, the acoustic detectors 314 include a 64-element ultrasonic transducer array from Ultrasonix (now Analogic), for example, with a central frequency of 3.5 MHz, 80% bandwidth at −6 dB and 0.254 mm pitch. The specifications of the acoustic detectors 314 are selected based on the sound waves generated by each kind of photoacoustic nanotracer 302. In another embodiment, the transducer array is an SU-107 model from Sonic Concepts of Bothell, Washington, USA.

Information from the acoustic detectors 314 may be used to identify and quantitate the different photoacoustic nanotracers 302. In some embodiments, the frequency and amplitude of the acoustic waves 316 are analyzed and compared to calibration curves to estimate the concentration of the different photoacoustic nanotracers 302.

The photoacoustic detection system 300 may include a controller 318 used to control the excitation source 312 and monitors the signals from the acoustic detectors 314. For example, control lines 320 from the controller 318 to the excitation source 312 may be used to start, stop, or adjust the pulse or emission frequency of the excitation source 312. The control lines 320 may also include power lines to power the excitation source 312. Sensor lines 322 may couple the controller 318 to the one or more acoustic detectors 314. A communications line 324 may couple the controller 318 to external devices, such as a distributed control system (DCS), cloud communication system, an intranet, or the Internet. The communications line 324 may be used to provide alerts to users to inform them that photoacoustic nanotracers 302 have been detected in the produced fluids. The controller 318 is described further with respect to FIG. 4.

After flowing through the sampling tubular 306, the produced fluids flow into a production line 326. The production line 326 carries the produced fluids to downstream equipment, such as water separation units, gas separation units, distillation units, pipelines, and the like.

Figure 4:
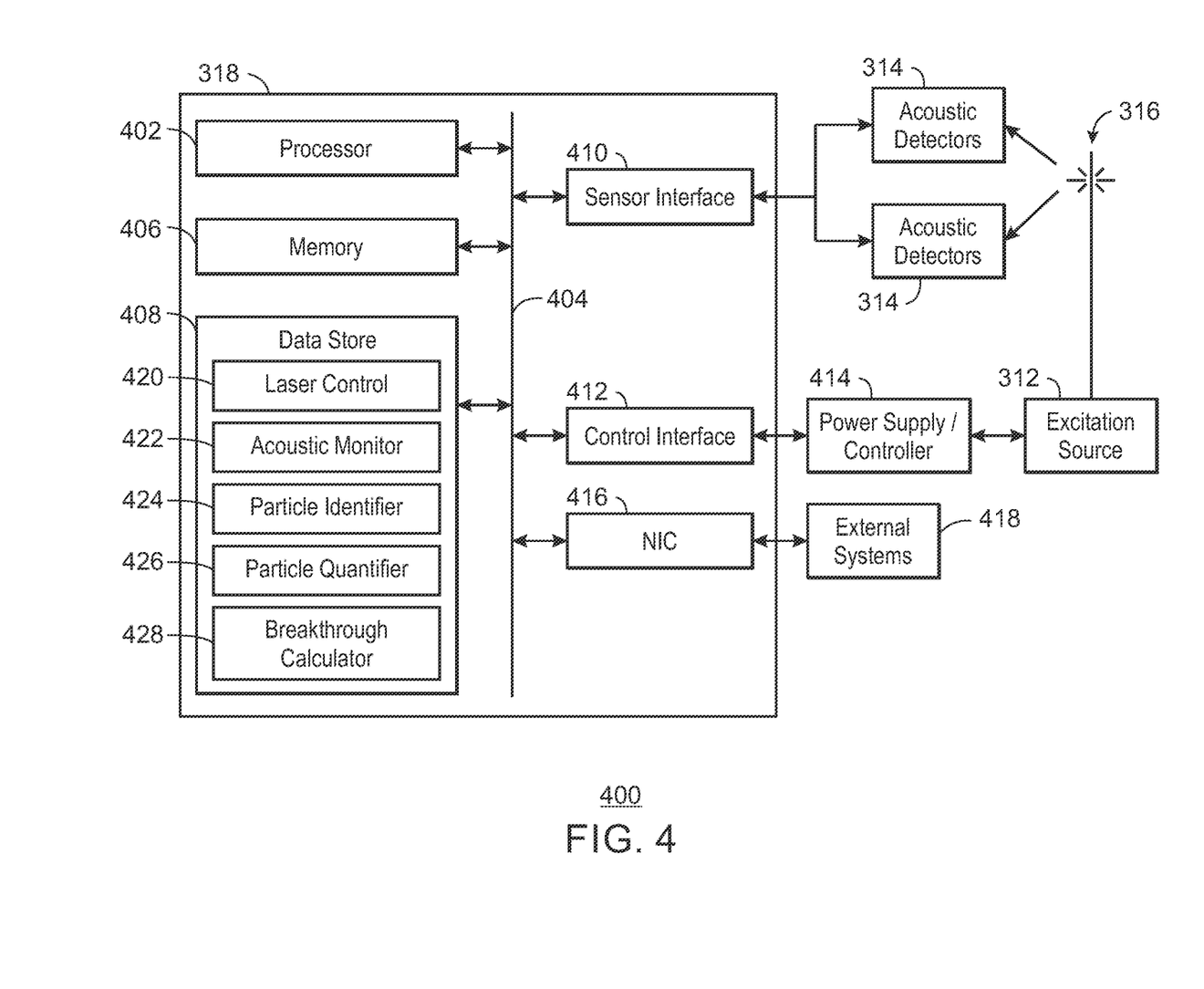
FIG. 4 is a block diagram of a photoacoustic detection system used for the analysis of photoacoustic nanotracers in produced fluids from a wellbore.

FIG. 4 is a block diagram of a photoacoustic detection system 400 used for the analysis of photoacoustic nanotracers 302 in produced fluids from a wellbore 304. Like numbered items are as described with respect to FIG. 3. It can be noted that the photoacoustic detection system 400 described with respect to FIG. 4 may be used in an off-line analysis in which the acoustic waves 316 are omitted from a nanoparticle in a concentrated sample of produced fluids. The photoacoustic detection system 400 includes the controller 318, acoustic detectors 314, and the excitation source 312. In some embodiments, the controller 318 is a microcontroller, for example, mounted in an enclosure at the wellbore 304. In other embodiments, the controller 318 is a virtual controller running on a processor in a DCS, on a virtual processor in a cloud server, or using other real or virtual processors.

The controller 318 includes a processor 402. The processor 402 may be a microprocessor, a multi-core processor, a multithreaded processor, an ultra-low-voltage processor, an embedded processor, or a virtual processor. In some embodiments, the processor 402 may be part of a system-on-a-chip (SoC) in which the processor 402 and the other components of the controller 318 are formed into a single integrated electronics package. In various embodiments, the processor 402 may include processors from Intel® Corporation of Santa Clara, California, USA, from Advanced Micro Devices, Inc. (AMD) of Sunnyvale, California, USA, or from ARM Holdings, LTD., Of Cambridge, England. Any number of other processors from other suppliers may also be used.

The processor 402 may communicate with other components of the controller 402 over a bus 404. The bus 404 may include any number of technologies, such as industry standard architecture (ISA), extended ISA (EISA), peripheral component interconnect (PCI), peripheral component interconnect extended (PCIx), PCI express (PCIe), or any number of other technologies. The bus 404 may be a proprietary bus, for example, used in an SoC based system. Other bus technologies may be used, in addition to, or instead of, the technologies above.

The bus 404 may couple the processor 402 to a memory 406. In some embodiments, such as in analytical instrument controllers, PLCs, and other process control units, the memory 406 is integrated with a data store 408 used for long-term storage of programs and data. The memory 406 include any number of volatile and nonvolatile memory devices, such as volatile random-access memory (RAM), static random-access memory (SRAM), flash memory, and the like. In smaller devices, such as PLCs, the memory 406 may include registers associated with the processor itself. The data store 408 is used for the persistent storage of information, such as data, applications, operating systems, and so forth. The data store 408 may be a nonvolatile RAM, a solid-state disk drive, or a flash drive, among others. In some embodiments, the data store 408 will include a hard disk drive, such as a micro hard disk drive, a regular hard disk drive, or an array of hard disk drives, for example, associated with a DCS or a cloud server.

The bus 404 couples the processor 402 to a sensor interface 410. The sensor interface 410 connects the controller 402 to the acoustic detectors 314. In some embodiments, the sensor interface 410 is a bank of high-speed, analog-to-digital converters (ADCs) used to convert analog signals from the acoustic detectors 314 into digital signals. In some embodiments, the sensor interface 410 is an I2C bus, a serial peripheral interface (SPI) bus, or a Fieldbus®, and the like. As described herein, the acoustic detectors 314 may include ultrasonic detector arrays, micro-electromechanical systems (MEMS) detectors, surface acoustic wave (SAW) detectors, quartz crystal microbalance (QCM) detectors, and film bulk acoustic resonators (FBARs), among others.

The bus 404 couples the processor 402 to a control interface 412 that is used to couple the controller 318 to a power supply/controller 414 for the excitation source 312. In some embodiments, the control interface 412 is a simple relay, MOSFET power controller, or other device to activate the power supply/controller 414 to start the excitation source 312. In some embodiments, the controller interface 412 is a serial bus, such as a USB, serial peripheral interface (SPI) bus, or a Fieldbus®, and the like, used to provide more complex parameters to the power supply/controller 414, such as pulse rate, excitation frequency, and the like.

The bus 404 couples the processor 402 to a network interface controller (NIC) 416. The NIC 416 couples the controller 318 to external systems 418, such as external control systems used for the production systems, including a DCS, PLC, a logging computer, or a SCADA transmitter, intranets, or the Internet, among others. For off-line systems used for analyzing concentrated production fluids, the external systems 418 may include laboratory computers, research networks, intranets, or the Internet, among others.

The data store 408 includes blocks of stored instructions that, when executed, direct the processor 402 to implement the functions of the controller 318. In some embodiments, the data store 408 includes a block 420 of instructions to direct the processor 402 to control the excitation source 312. In various embodiments this is performed, for example, by activating a relay in the controller interface to activate the power supply/controller 414, activating a MOSFET in the controller interface to activate the power supply/controller 414, or by sending instructions over a bus to a control unit in the power supply/controller 414. In some embodiments, the block 420 of instructions may direct the processor to communicate parameters to the power supply/controller 414 for the excitation source 312, such as pulse rate, excitation frequency, and the like.

In some embodiments, the data store 408 includes a block 422 of instructions to direct the processor to monitor the acoustic detectors 314, for example, through the sensor interface 410. The block 422 of instructions may direct the processor to initiate monitoring after the excitation source 312 has been started.

In some embodiments, the data store 408 includes a block 424 of instructions to direct the processor 402 to analyze the frequency response from the acoustic detectors 314 to identify the type of photoacoustic nanotracer detected. This may be used, for example, when an ensemble of different photoacoustic nanotracers, such as from different injection wells, is expected.

In some embodiments, the data store 408 includes a block 426 of instructions to direct the processor 402 to quantify each of the different types of photoacoustic nanotracers present in the produced fluids. The block 426 of instructions may direct the processor 402 to count the individual number of nanoparticles detected of each type of photoacoustic nanotracer. In some embodiments, the block 426 of instructions may direct the processor 402 to compare the amplitude of the acoustic signal to a calibration curve.

In some embodiments, the data store 408 includes a block 428 of instructions to direct the processor 402 to calculate a breakthrough time, for example, as a flow from an injection well reaches a production well.

Figure 5:
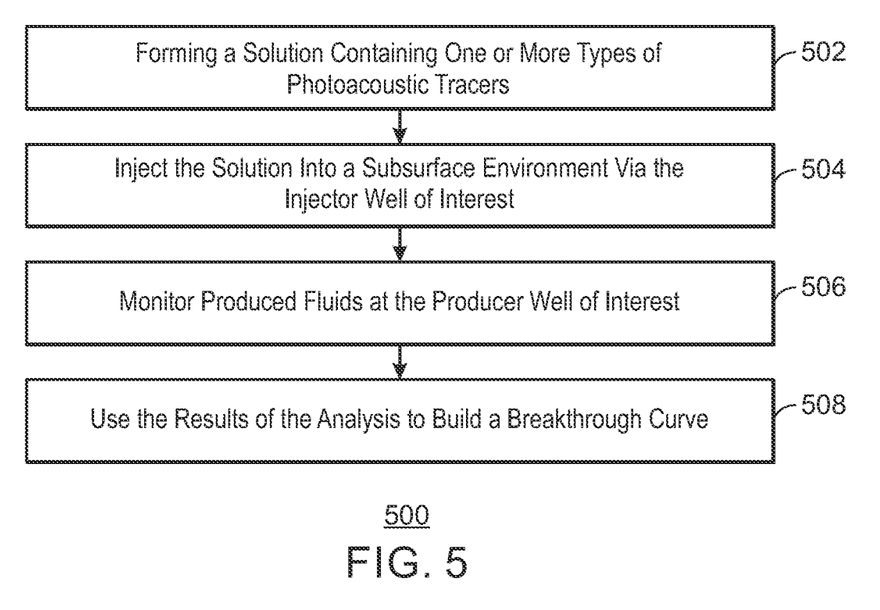
FIG. 5 is a process flow diagram of a method for characterizing a subsurface environment using photoacoustic nanotracers.

FIG. 5 is a process flow diagram of a method 500 for characterizing a subsurface environment using photoacoustic nanotracers. The method begins at block 502, with the creation of a solution that includes one or more types of photoacoustic nanotracers, as described herein. The solution may be water-based or oil-based depending on the material being tracked.

At block 504, the solution is injected into a subsurface environment through an injector well of interest. In some applications, different photoacoustic nanotracers are injected through different injector wells.

At block 506, the produced fluids at the producer well of interest are monitored for the presence of photoacoustic nanotracers. As described herein, in some embodiments, this is performed by an online detector.

In some embodiments, the produced fluids are monitored by performing sampling followed by concentration of the sample of produced fluids followed by off-line analysis. In some embodiments, the produced fluids are treated to separate any photoacoustic nanotracers that may be present from the produced fluids. In both of these embodiments, off-line analysis may be used to determine the types and amounts of photoacoustic nanotracers present.

At block 508, the results of the analyses, online or off-line, are used to build a breakthrough curve to determine the timing of flow between the injection well in the production well.

Figure 6:
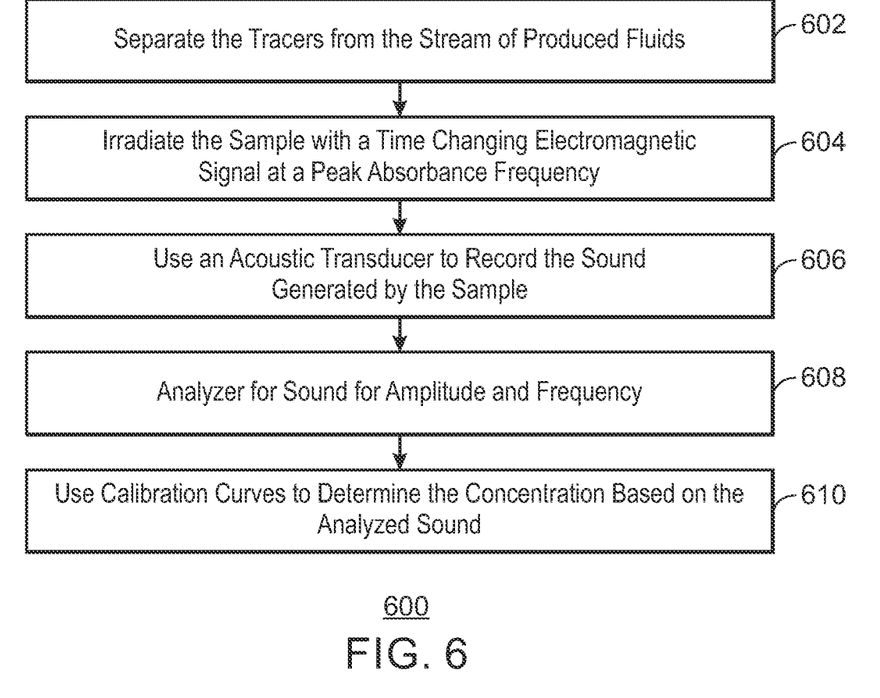
FIG. 6 is a process flow diagram of a method for analyzing the produced fluids for tracers.

FIG. 6 is a process flow diagram of a method 600 for analyzing the produced fluids for tracers. In this example, a sample is collected at block 506 for the analysis. The method begins at block 602, with the concentration of the produced fluids. In some embodiments, the photoacoustic nanotracers are separated from the produced fluids before the analysis. It may be noted that in some embodiments, the produced fluids are used without further concentration, for example, when an online detector is impractical or uneconomical.

At block 604, the sample is irradiated with a pulsed or time-changing EM signal, for example, at the peak absorbance frequency of a photoacoustic nanotracer. At block 606, and acoustic detector is used to record the sound generated by the sample. At block 608, the sound is analyzed for amplitude and frequency. For example, the frequency may be used to identify the type of photoacoustic nanotracer detected. At block 610, calibration curves are used to determine the concentration of the photoacoustic nanotracers identified based, at least in part, on the measured signal from the acoustic detectors. The method 600 as described from block 604 to block 610 may also be used for the online detection system.

An embodiment described herein provides a method for using a photoacoustic nanotracer to characterize a subsurface environment. The method includes forming a solution including a photoacoustic nanotracer, injecting the solution into the subsurface environment, and analyzing produced fluids for the photoacoustic nanotracer. A breakthrough curve is built based, at least in part, on the analysis.

In an aspect, the solution is formed to include a number of photoacoustic nanotracers. In an aspect, the solution is injected into the subsurface environment through an injection well. In an aspect, the produced fluids are removed from the subsurface environment through a production well.

In an aspect, the method includes irradiating the produced fluids with a time changing electromagnetic signal at an absorbance frequency for the photoacoustic nanotracer, and using an acoustic transducer to record sound generated by the produced fluids. In an aspect, the produced fluids are irradiated in a section of a production line.

In an aspect, the produced fluids are concentrated before irradiating the produced fluids. In an aspect, the photoacoustic nanotracer is separated from the produced fluids.

In an aspect, the sound is analyzed for amplitude and frequency. In an aspect, the method includes determining a concentration of the photoacoustic nanotracer based, at least in part, on the analyzed sound. In an aspect, the method includes identifying the photoacoustic nanotracer in a number of photoacoustic nanotracers by the frequency.

In an aspect, the method includes using a nanoparticle as the photoacoustic nanotracer. In an aspect, the method includes functionalizing a surface of the nanoparticle with a surfactant. In an aspect, the method includes forming a coating over a surface of the nanoparticle.

Another embodiment described herein provides a system for characterizing a subsurface environment. The system includes, a pulsed laser, an acoustic detector, and a photoacoustic nanotracer including nanoparticles, wherein the pulsed laser irradiates produced fluids and, when a nanoparticle is in a beam from the pulsed laser, the acoustic detector detects an acoustic signal.

In an aspect, the system includes an online sampling system. In the online sampling system, the pulsed laser is configured to irradiate the produced fluids in a tubular from a wellbore, wherein the acoustic detector is configured to detect the acoustic signal from the nanoparticles in the tubular.

In an aspect, the system includes a controller coupled to the pulsed laser and the acoustic detector. The controller includes a processor and a storage system. The storage system includes code configured to direct the processor to monitor the acoustic detector, and send a message when the acoustic detector detects the acoustic signal.

In an aspect, the storage system includes code configured to direct the processor to activate a power supply to the laser.

In an aspect, the system includes a second acoustic detector, wherein the second acoustic detector is configured to detect the acoustic signals at a different frequency from the acoustic detector.

In an aspect, the storage system includes code configured to direct the processor to identify different types of photoacoustic nanotracers based, at least in part, on the different frequency. In an aspect, the storage system includes code configured to direct the processor to count nanoparticles detected by acoustic signals. In an aspect, the storage system includes code configured to direct the processor to calculate a breakthrough curve.

Other implementations are also within the scope of the following claims.

What is claimed is:

1. A method for using a photoacoustic nanotracer to characterize a subsurface environment, comprising:
    forming a solution comprising a photoacoustic nanotracer, wherein the photoacoustic nanotracer comprises nanoparticles that emit sound when excited by electromagnetic radiation;
    injecting the solution into the subsurface environment;
    analyzing produced fluids for the photoacoustic nanotracer; and
    building a breakthrough curve based, at least in part, on the analysis.

2. The method of claim 1, comprising forming the solution comprising a plurality of photoacoustic nanotracers.

3. The method of claim 1, comprising injecting the solution into the subsurface environment through an injection well.

4. The method of claim 1, comprising removing the produced fluids from the subsurface environment through a production well.

5. The method of claim 1, comprising:
    irradiating the produced fluids with a time changing electromagnetic signal at an absorbance frequency for the photoacoustic nanotracer; and
    using an acoustic transducer to record sound generated by the produced fluids.

6. The method of claim 5, comprising irradiating the produced fluids in a section of a production line.

7. The method of claim 5, comprising concentrating the produced fluids before irradiating the produced fluids.

8. The method of claim 5, comprising separating the photoacoustic nanotracer from the produced fluids.

9. The method of claim 5, comprising analyzing the sound for amplitude and frequency.

10. The method of claim 9, comprising determining a concentration of the photoacoustic nanotracer based, at least in part, on the analyzed sound.

11. The method of claim 9, comprising identifying the photoacoustic nanotracer in a plurality of photoacoustic nanotracers by the frequency.

12. The method of claim 1, comprising using a nanoparticle as the photoacoustic nanotracer.

13. The method of claim 12, comprising functionalizing a surface of the nanoparticle with a surfactant.

14. The method of claim 12, comprising forming a coating over a surface of the nanoparticle.

* * * * *